Figure 1:
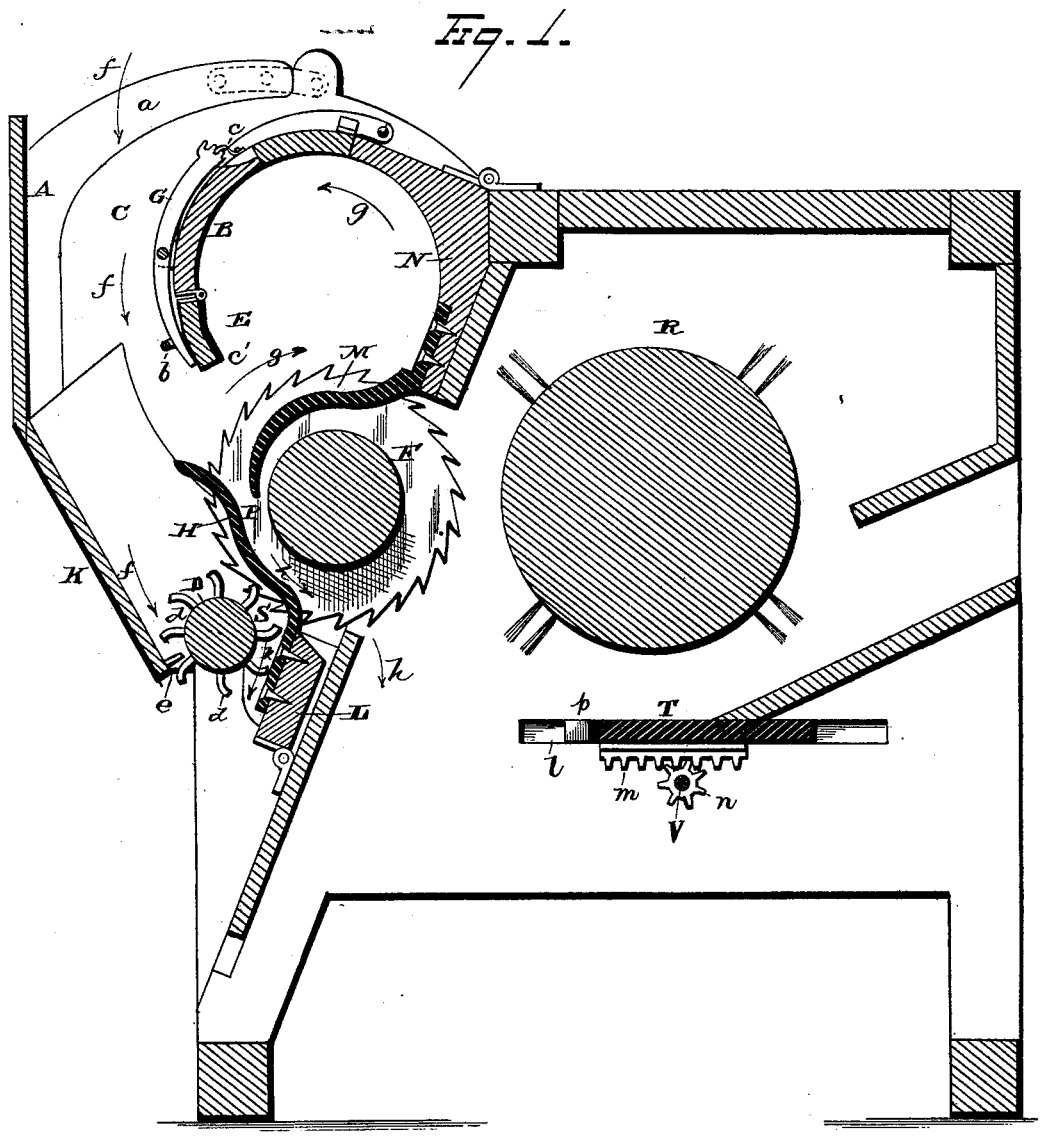

2 Sheets—Sheet 1.

F. E. SMITH
Cotton-Gin.

No. 220,880.      Patented Oct. 21, 1879.

WITNESSES
A. W. Bright
F. O. McCleary

INVENTOR
F. E. Smith
By H. W. Seymour
ATTORNEY

N. PETERS, PHOTO-LITHOGRAPHER, WASHINGTON, D C.

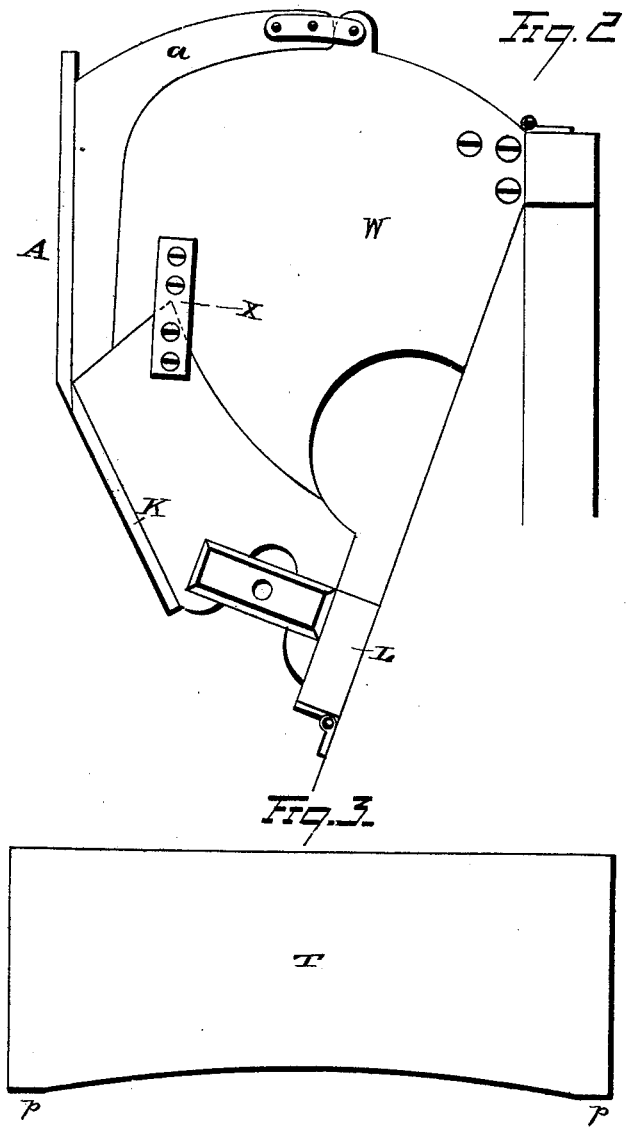

UNITED STATES PATENT OFFICE.

FERDINAND E. SMITH, OF PRATTVILLE, ALABAMA.

IMPROVEMENT IN COTTON-GINS.

Specification forming part of Letters Patent No. 220,880, dated October 21, 1879; application filed August 2, 1879.

*To all whom it may concern:*

Be it known that I, FERDINAND ELLIS SMITH, of Prattville, in the county of Autauga and State of Alabama, have invented certain new and useful Improvements in Cotton-Gins; and I do hereby declare the following to be a full, clear, and exact description of the invention, such as will enable others skilled in the art to which it pertains to make and use it, reference being had to the accompanying drawings, which form part of this specification.

My invention relates to cotton-gins, and, while it is adapted for ginning either trashy or clean cotton, it is especially intended to gin cotton that has been carelessly picked out of the field and contains hulls and trash of all description.

My invention consists in the construction hereinafter described and claimed for accomplishing the above operation.

Referring to the drawings, Figure 1 is a view in vertical transverse section. Fig. 2 is a detail view of one of the sectional heads of the cotton-box. Fig. 3 is a detail plan view of the mote-board.

The outer front wall or apron, A, is vertical, and extends below the inner wall or apron, B. Between the two a feed-opening, C, is formed, through which the cotton passes down to the feed-roll D. Vertically-curved arms $a$ extend rearward from said outer front wall, and are hinged to the top of the cotton-box, so as to permit said wall to be swung rearward and upward for cleaning the cotton-box, grates, and saws. Said inner wall is likewise hinged to the top of the cotton-box, thus permitting free and full access to the interior of the cotton-box. The seed-board E is hinged to the lower portion of this inner swinging wall, and is secured in adjustment to or from the saw-cylinder F by a lever, G, pivoted to said wall, while its lower extremity works loosely in a loop, $b$, secured to the seed-board. The upper extremity of said lever is made in toothed-segment form, and engages with a spring-catch, $c$, projecting forward from said inner swinging wall. By this adjustment the seed is caused to shed slow or fast, according to the condition of the cotton and the speed of the gin.

The lower portion of the seed-board has its inner surface formed projecting inwardly toward the saw-cylinder, as shown at $c'$. This surface is angular to the remaining inner surface of the seed-board, and causes the cotton-roll to tighten or contract just prior to freeing itself from the seed-board, and the consequent expansion of the cotton-roll causes the clean seed to drop more readily from the latter.

The feed-roll may be banded, geared, or otherwise connected to the saw-shaft for purpose of driving. Its periphery is provided with pins or spikes $d$, projecting therefrom, preferably in line with the respective lower grate, H, and the spaces formed between the spikes or pins $e$, which project inwardly from the lower edge of the stationary front wall, K. Said lower grate, H, is securely fastened to a bar, L, located in front of and below the saw-cylinder. The bars of said lower grate extend upwardly between the saws, and their free extremities project forward from the latter a sufficient distance to separate the hulls and foreign substance from the cotton as the latter is brought up by the saws. The upper grate, M, is likewise securely fastened to a bar, N, preferably hinged to the top of the gin, and its bars extend downward between the saws. Their free extremities project inward, so as to provide a free passage-way, P, for the egress of the seed between the same and the free extremities of the lower grating. The points at which the free ends of both gratings terminate are approximately in the horizontal central plane of the saw-cylinder.

The seed-cotton, being fed to the gin in the direction of the arrows $f$, drops on the pins $e$, and is carried over to the saws by the pins $d$ on the feed-roll D. The lower grate screens the hulls or foreign substances from the cotton as the latter is carried up into the cotton-box, forming a roll running in the direction of arrows $g$. The cotton is ginned on the upper grate, the lint being carried between the ribs or grates on the saws, taken from the saw-teeth by a brush-cylinder, R, and thrown into the lint-room. The seed is shed or dropped from the cotton-roll at the seed-board into the passage-way P, and passed out in the direction of arrow $h$. The hulls and foreign substances are thereby separated from the cotton before the latter is subjected to the ginning process, and are discharged from the gin through the passage-way S in the direction of the arrow h.

The mote-board T has sliding movement in grooved ways l, and racks m are secured to its under surface at both extremities. A rotary shaft, V, is journaled beneath the mote-board, and is actuated in revolution by a crank or other suitable device. Pinions n, secured to the shaft, mesh with said racks and adjust the board forward or backward.

The mote-board is formed with its ends projecting forward of the line of the main central portion of said board, as shown at p p in Fig. 3, whereby cotton is prevented from dropping with motes, as is sometimes the case when the mote-board is moved backward sufficiently far for the gin to mote well.

The heads W of the cotton-box are each made of an upper and a lower section, said sections being hinged to corresponding portions of the gin-frame, so that they may be swung in opposite directions to allow free access to the saw-cylinder. Connecting devices X detachably secure the two sections of each head together.

Having fully described my invention, what I claim as new, and desire to secure by Letters Patent, is—

1. The combination, with a frame and saw-cylinder, and two hinged cross-bars located, respectively, above and below the saw, of a grating whose lower extremity is secured to said lower cross-bar, and whose free upper extremity projects from the forward central portion of the saw, together with a grating whose upper extremity is secured to said upper cross-bar, and whose free lower extremity extends to the forward central portion of the saw, said cross-bars being adapted to be swung in opposite directions, and thereby carry their respective gratings away from the saw, so as to give free access to the latter, substantially as set forth.

2. The combination, with a frame and a front swinging wall of a cotton-box, of a seed-board hinged to the lower edge of said wall, and formed with both an upper and a lower longitudinal face, said faces being plane and angularly located relatively to each other, so that the lower face projects inwardly from the upper face, substantially as set forth.

3. In a cotton-gin, the combination, with box-heads formed in upper and lower sections, respectively hinged to corresponding gin-frame portions, of connecting devices which detachably secure together the two sections of each head, substantially as set forth.

In testimony that I claim the foregoing I have hereunto set my hand this 28th day of July, 1879.

FERDINAND E. SMITH.

Witnesses:
J. A. SMILEY,
D. T. SMITH.